(12) United States Patent
Zhong (10) Patent No.: US 10,004,017 B2
(45) Date of Patent: Jun. 19, 2018

(54) SWITCHING METHOD AND SWITCHING SYSTEM BETWEEN HETEROGENEOUS NETWORKS

(71) Applicant: YULONG COMPUTER TELECOMMUNICATION SCIENTIFIC (SHENZHEN) CO., LTD., Shenzhen (CN)

(72) Inventor: Yan-Tao Zhong, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 0 days. days.

(21) Appl. No.: 15/323,285

(22) PCT Filed: Aug. 13, 2014

(86) PCT No.: PCT/CN2014/084305
§ 371 (c)(1),
(2) Date: Dec. 30, 2016

(87) PCT Pub. No.: WO2016/023198
PCT Pub. Date: Feb. 18, 2016

(65) Prior Publication Data
US 2017/0150411 A1    May 25, 2017

(51) Int. Cl.
*H04L 29/06* (2006.01)
*H04W 36/14* (2009.01)
(Continued)

(52) U.S. Cl.
CPC .......... *H04W 36/14* (2013.01); *H04L 9/0869* (2013.01); *H04L 63/0281* (2013.01);
(Continued)

(58) Field of Classification Search
CPC ....... H04W 36/14; H04W 8/02; H04W 48/18; H04W 36/0055; H04W 76/021;
(Continued)

(56) References Cited

U.S. PATENT DOCUMENTS 7,574,599 B1 * 8/2009 Zhang ................... H04L 63/061
713/168
8,681,740 B2 * 3/2014 Bovo ...................... H04L 43/18
370/331
(Continued)

OTHER PUBLICATIONS

El Bouabidi, Imen et al., "Secure Handoff Protocol in 3GPP LTE Networks" Third International Conference on Communications and Networking, Mar. 29, 2012-Apr. 1, 2012, pp. 1-6.*
Bargh, M.S et al., "UMTS-AKA and EAP-AKA Inter-working for Fast Handovers in All-IP Networks", Globecom Workshops, 2007 IEEE, pp. 1-6.*

*Primary Examiner* — Michael Pyzocha
(74) *Attorney, Agent, or Firm* — ScienBiziP, P.C.

(57) ABSTRACT

A switching method and system between heterogeneous networks are provided. In the switching method: a terminal sends identity information and a network access identifier to a home subscriber server (HSS) through a mobile management entity; the HSS sends the network access identifier to an access gateway, receives a seed key, sends the seed key to the terminal, calculates and sends a local key and a local identifier to an authentication, authorization and accounting (AAA) server; the terminal calculates a second handoff key and a second handoff identifier; and the AAA server sends a calculated first handoff key to an access point of the target network, for the access point and the terminal to execute a network switching operation. Communication traffic of a re-authentication process can be effectively decreased when a cellular network is switched to a WLAN, thereby decreasing time delay of re-authentication and increasing probability of success in switching.

14 Claims, 3 Drawing Sheets

(51) Int. Cl.
  *H04W 76/11*   (2018.01)
  *H04L 9/08*    (2006.01)
  *H04W 36/00*   (2009.01)
  *H04W 48/18*   (2009.01)
  *H04W 8/02*    (2009.01)

(52) U.S. Cl.
  CPC ........ *H04L 63/061* (2013.01); *H04L 63/0892* (2013.01); *H04W 8/02* (2013.01); *H04W 36/0055* (2013.01); *H04W 48/18* (2013.01); *H04W 76/11* (2018.02)

(58) Field of Classification Search
  CPC . H04L 9/0869; H04L 63/0281; H04L 63/061; H04L 63/0892
  See application file for complete search history.

(56) References Cited

U.S. PATENT DOCUMENTS

| | | | |
|---|---|---|---|
| 2003/0091013 A1* | 5/2003 | Song | H04L 63/08 370/338 |
| 2007/0249352 A1* | 10/2007 | Song | H04L 63/08 455/436 |
| 2009/0086973 A1* | 4/2009 | Buddhikot | H04L 9/0822 380/273 |
| 2009/0109925 A1* | 4/2009 | Nakamura | H04L 63/062 370/331 |
| 2009/0209259 A1* | 8/2009 | Brusilovsky | H04W 12/04 455/438 |
| 2013/0128866 A1* | 5/2013 | Zhang | H04W 12/06 370/331 |
| 2017/0231020 A1* | 8/2017 | Tomici | H04W 76/021 |

\* cited by examiner

SWITCHING METHOD AND SWITCHING SYSTEM BETWEEN HETEROGENEOUS NETWORKS

FIELD

The embodiments of the present disclosure relate to communication technology, and specifically to a switching method and a switching system between heterogeneous networks.

BACKGROUND

With the market development of mobile Internet and the popularity of intelligent terminal, the volume of data services has increased rapidly. Wireless data services provided by operators are increased by nearly 50 times from 2006 to 2009, and CISCO forecasts that the wireless data services in 2014 will increase more than 15 times from 2010. However, the third generation of wireless mobile telecommunications technology (3G) network is far from satisfying users' needs that grow rapidly, even the Long Term Evolution (LTE) may not completely satisfy all demands in the future.

A wireless local area network (WLAN) can be used to supplement and collaborate current cellular technology, and can help the operators to solve problems in data service shunting, the problems include sudden increase of data traffic of cellular networks, excessive consumption of wireless resources, and network overload.

As current local hot spots, the WLAN coverage, with cellular wide area network (WAN) of 3G/4G (the fourth generation of wireless mobile telecommunications technology) have become necessary in future wireless communication. In a process of heterogeneous network interconnection, LTE-WLAN heterogeneous network switching mechanism is a core problem of heterogeneous network interconnection.

In order to guarantee a secured switch from the LTE to the WLAN in the 3rd Generation Partnership Project (3GPP), Extensible Authentication Protocol (EAP)—Authentication and Key Agreement (AKA) protocol are used as a standardization switching process of the LTE to the WLAN in 3GPP standard. The EAP-AKA protocol can achieve authentication between a user equipment (UE) and a home subscriber server (HSS), and establish a shared key between the UE and an access point of the WLAN.

However, as the EAP-AKA protocol involves a re-authentication process during a switching process, a main reason that EAP-AKA switch failed is timeout of time delay. According to statistics, process time of the re-authentication process is 46 percent (46%) of the entire time delay of a whole EAP-AKA switching process on average. If the process can be designed optimally, switching time can be decreased, thereby avoiding LTE to the WLAN switching failures caused by timeouts.

Therefore, optimizing the switching process from the LTE network to the WLAN of the terminal and avoiding switching failures caused by long switching time are problematic.

SUMMARY

To solve the above problem, the present disclosure provides a new way, which can effectively decreases communication traffic of a re-authentication process when a cellular network (for example, an LTE network) is switched to a WLAN, thereby decreasing time delay of re-authentication, and effectively increasing the probability of success in switching.

Therefore, according to one aspect of the present disclosure, a switching method between heterogeneous networks is provided and includes: sending identity information of a terminal and a network access identifier of a target network to a home subscriber server (HSS) using the terminal through a mobile management entity (MME); sending the network access identifier by the HSS to an access gateway of the target network, for the access gateway to generate a seed key according to the network access identifier; receiving the seed key by the HSS from the access gateway and sending the seed key to the terminal, calculating a local key and a local identifier according to the seed key, and sending the local key and the local identifier to an authentication, authorization and accounting (AAA) server of the target network, for the AAA server to calculate a first handoff key and a corresponding first handoff identifier, to switch networks; calculating a second handoff key and a second handoff identifier according to the seed key by the terminal, to switch the networks; and sending the calculated first handoff key by the AAA server to an access point of the target network, for the access point and the terminal to execute a network switching operation according to the first handoff key and the second handoff key.

In the above embodiment, by sending the seed key from the HSS to the terminal, the terminal can calculate the second handoff key for a network switching, and execute the network switching operation according to the first handoff key calculated by the AAA server and the access point of the target network. Compared with the EAP-AKA protocol used in the 3GPP standard, the present disclosure can effectively decreases the communication traffic of the re-authentication process when a cellular network (for example, an LTE network) is switched to a WLAN, thereby decreasing the time delay of re-authentication, and effectively increasing the probability of success in switching. At the same time, as little change has been made to current communication protocols by the present disclosure, thus, the present disclosure can be deployed to current network systems conveniently.

In the above embodiment, preferably, the step of sending the identity information of the terminal and the network access identifier to the HSS using the terminal through the MME includes: sending an Authentication and Key Agreement (AKA) including the identity information and the network access identifier to the MME by the terminal; authenticating an identity of the terminal by the MME, and sending the identity information and the network access identifier to the HSS when the identity of the terminal is authenticated successfully.

In the above embodiment, the MME authenticates the identity of the terminal by using a standard authentication process to authenticate the terminal, and no network switching is executed when the identity of the terminal fails to be authenticated.

In the above embodiment, preferably, sending the network access identifier by the HSS to the access gateway includes: generating a first random number, and sending the first random number to the access gateway.

In the above embodiment, preferably, before the access gateway generates the seed key according to the network access identifier, the switching method further includes: checking freshness of the first random number, and generating the seed key after passing the freshness check.

In the above embodiment, through generating the first random number by the HSS and checking the freshness of the first random number by the access gateway, replay attacks can be prevented effectively, and data safety can be ensured.

In the above embodiment, preferably, before the access gateway sends the seed key to the HSS, the switching method further includes: generating a second random number, and encrypting the seed key, the first random number and the second random number; and sending the seed key to the HSS by the access gateway, including: sending the seed key, the first random number and the second random number to the HSS after encrypting.

Similarly, through generating the second random number by the access gateway, the data safety during a transmission process can be ensured effectively. A public key of the HSS can be used as a key to encrypt the seed key, the first random number and the second random number.

In the above embodiment, preferably, receiving the seed key by the HSS from the access gateway and sending the seed key to the terminal includes: decrypting the seed key, the first random number and the second random number by the HSS; and re-encrypting the seed key, the first random number and the second random number after decryption, and sending the seed key, the first random number and the second random number to the terminal.

In the above embodiment, by encrypting data to be sent to the terminal, the data safety can be ensured effectively.

In the above embodiment, preferably, before the HSS sends the local key and the local identifier to the AAA server of the target network, the switching method further includes: encrypting the local key and the local identifier.

In the above embodiment, preferably, before the access point and the terminal execute the network switching operation, the switching method further includes: sending an access request to the access point by the terminal; receiving the access request by the access point, sending an authentication request to the terminal, to make the terminal respond to the authentication request and return response data; receiving the response data from the terminal by the access point, and returning successfully authenticated information to the terminal when an authentication of the terminal is determined to be passed according to the response data; executing a re-authentication process with the AAA server by the terminal when the terminal receives the successfully authenticated information; and sending the first handoff key to the access point when the AAA server determines that the re-authentication process with the terminal is successful.

In the above embodiment, preferably, the network switching operation executed by the access point and the terminal includes: when the access point determines that the first handoff key is the same as the second handoff key, executing a connection key generation operation with the terminal, for the terminal to connect to the access point using the connection key.

In the above embodiment, preferably, the MME is a Long Term Evaluation (LTE) MME, and the HSS is an LTE HSS, and the target network is a wireless local area network (WLAN).

According to a second aspect of the present disclosure, a switching system between heterogeneous networks is provided and includes: a terminal configured to send identity information of the terminal and a network access identifier of a target network to a home subscriber server (HSS) through a mobile management entity (MME), and calculate a second handoff key and a second handoff identifier to switch networks according to a seed key sent by the HSS; the HSS configured to send the network access identifier to an access gateway of the target network for the access gateway to generate the seed key according to the network access identifier, receive the seed key from the access gateway and send the seed key to the terminal, calculate a local key and a local identifier according to the seed key, and send the local key and the local identifier to an authentication, authorization and accounting (AAA) server of the target network; the access gateway configured to generate the seed key according to the network access identifier sent by the HSS, and send the seed key to the HSS; and the AAA server configured to calculate a first handoff key and a corresponding first handoff identifier to switch the networks according to the local key and the local identifier sent by the HSS, and send the calculated first handoff key to an access point of the target network, for the access point and the terminal to execute a network switching operation according to the first handoff key and the second handoff key.

In the above embodiment, by sending the seed key from the HSS to the terminal, the terminal can calculate the second handoff key for a network switching, and execute the network switching operation according to the first handoff key calculated by the AAA server and the access point of the target network. Compared with the EAP-AKA protocol used in the 3GPP standard, the present disclosure can effectively decreases the communication traffic of the re-authentication process when a cellular network (for example, an LTE network) is switched to a WLAN, thereby decreasing the time delay of re-authentication, and effectively increasing the probability of success in switching. In addition, as little change has been made to current communication protocols by the present disclosure, thus, the present disclosure can be deployed to current network systems conveniently.

In the above embodiment, preferably, the terminal is further configured to send an Authentication and Key Agreement (AKA) including the identity information and the network access identifier to the MME; and the MME is configured to authenticate an identity of the terminal, and send the identity information and the network access identifier to the HSS when the identity of the terminal is authenticated successfully.

In the above embodiment, the MME authenticates the identity of the terminal by using a standard authentication process to authenticate the terminal, and no network switching is executed when the identity of the terminal fails to be authenticated.

In the above embodiment, preferably, the HSS is further configured to: generate a first random number and send the first random number to the access gateway, when the HSS sends the network access identifier to the access gateway.

In the above embodiment, preferably, before generating the seed key according to the network access identifier, the access gateway is further configured to: check freshness of the first random number and generate the seed key after passing the freshness check.

In the above embodiment, through generating the first random number by the HSS and checking the freshness of the first random number by the access gateway, replay attack can be prevented effectively, and data safety can be ensured.

In the above embodiment, preferably, before the access gateway sends the seed key to the HSS, the access gateway is further configured to: generate a second random number, and encrypt the seed key, the first random number and the second random number; and send the seed key, the first random number and the second random number to the HSS after encrypting.

Similarly, through generating the second random number by the access gateway, the data safety during a transmission process can be ensured effectively. A public key of the HSS can be used as a key to encrypt the seed key, the first random number and the second random number.

In the above embodiment, preferably, the HSS is further configured to: decrypt the seed key, the first random number and the second random number; and re-encrypt the seed key, the first random number and the second random number after decryption, and send the seed key, the first random number and the second random number to the terminal.

In the above embodiment, by encrypting data to be sent to the terminal, the data safety can be ensured effectively.

In the above embodiment, preferably, before the HSS sends the local key and the local identifier to the AAA server of the target network, the HSS is further configured to: encrypt the local key and the local identifier.

In the above embodiment, preferably, before executing the network switching operation with the access point, the terminal is further configured to: send an access request to the access point, respond to an authentication request sent by the access point, and return response data of the authentication request to the access point; and execute a re-authentication process with the AAA server when the terminal receives successfully authenticated information sent from the access point; the access point is further configured to: send the authentication request to the terminal when the access point receives the access request from the terminal, to make the terminal respond to the authentication request; and receive the response data from the terminal, and return the successfully authenticated information to the terminal when an authentication of the terminal is determined to be passed according to the response data; and the AAA server is further configured to send the first handoff key to the access point when the AAA server determines that the re-authentication process with the terminal is successful.

In the above embodiment, preferably, the access point is further configured to: determine whether the first handoff key is the same as the second handoff key; and when the first handoff key is the same as the second handoff key, execute a connection key generation operation with the terminal, for the terminal to connect to the access point using the connection key.

In the above embodiment, preferably, the MME is an LTE MME, and the HSS is an LTE HSS, and the target network is a WLAN.

By utilizing the above embodiments, the communication traffic of a re-authentication process when a cellular network (for example, an LTE network) is switched to a WLAN can be effectively decreased, thereby decreasing time delay of re-authentication, and effectively increasing the probability of success in switching. In addition, as little change has been made to current communication protocols by the present disclosure, thus, the present disclosure can be deployed to current network systems conveniently.

DETAILED DESCRIPTION

For clarity of illustration of objectives, features and advantages of the present disclosure, where appropriate, the above drawings combined with detailed description illustrate the embodiments of the present disclosure hereinafter. It may be appreciated that different embodiments and parts in the different embodiment of the present disclosure can be combined, when there is no conflict.

The embodiments described herein are for better understanding of the present disclosure, other embodiments can also be practiced. The description is not to be considered as limiting the scope of the embodiments described herein.

Figure 1:
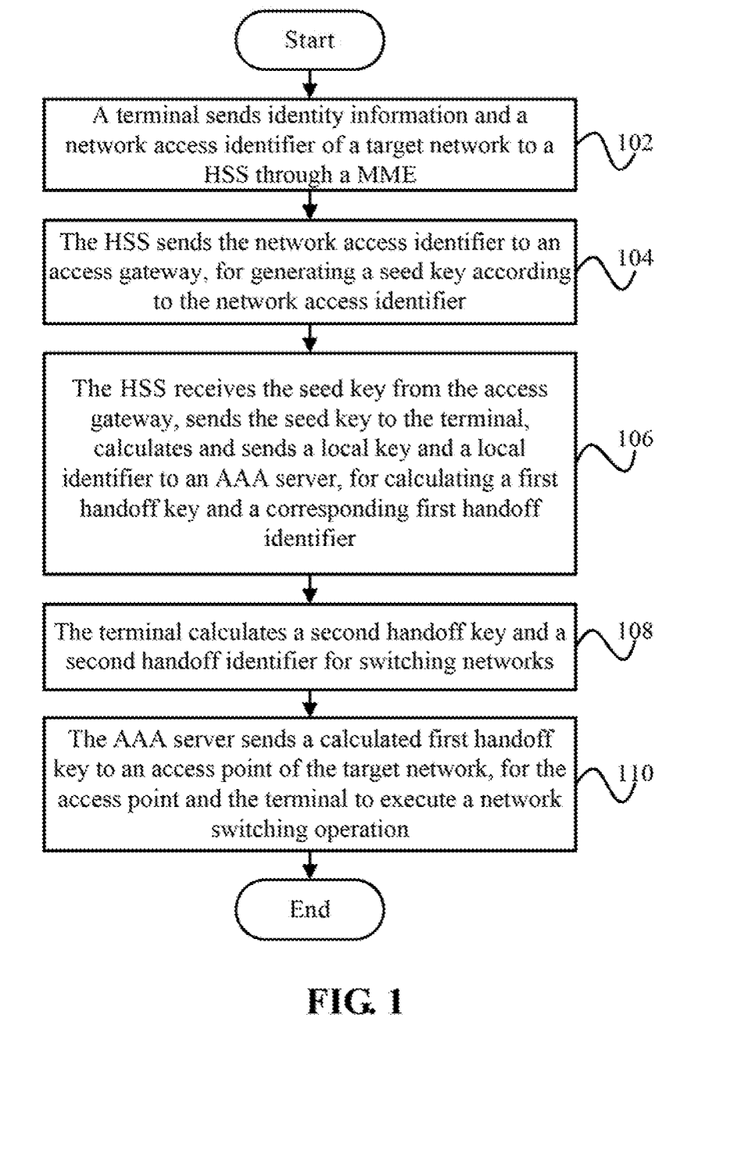
FIG. 1 shows a flowchart of one embodiment of a switching method between heterogeneous networks according to the present disclosure.

FIG. 1 shows a flowchart of one embodiment of a switching method between heterogeneous networks according to the present disclosure.

As shown in FIG. 1, according to one embodiment of the present disclosure, the switching method between heterogeneous networks includes: step 102, a terminal sends identity information of the terminal and a network access identifier of a target network to a home subscriber server (HSS) through a mobile management entity (MME); step 104, the HSS sends the network access identifier to an access gateway of the target network, for the access gateway to generate the seed key according to the network access identifier; step 106, the HSS receives the seed key from the access gateway and sends the seed key to the terminal, calculates a local key and a local identifier according to the seed key, and sends the local key and the local identifier to an authentication, authorization and accounting (AAA) server of the target network, for the AAA server to calculate a first handoff key and a corresponding first handoff identifier; step 108, the terminal calculates a second handoff key and a second handoff identifier to switch networks according to the seed key; and step 110, the AAA server sends the calculated first handoff key to an access point of the target network, for the access point and the terminal to execute a network switching operation according to the first handoff key and the second handoff key.

In the above embodiment, by sending the seed key from the HSS to the terminal, the terminal can calculate the second handoff key for a network switching, and execute the network switching operation according to the first handoff key calculated by the AAA server and the access point of the target network. Compared with the EAP-AKA protocol used in the 3GPP standard, the present disclosure can effectively decreases the communication traffic of the re-authentication process when a cellular network (for example, an LTE network) is switched to a WLAN, thereby decreasing the time delay of re-authentication, and effectively increasing the probability of success in switching. At the same time, as little change has been made to current communication protocols by the present disclosure, thus, the present disclosure can be deployed to current network systems conveniently.

In the above embodiment, preferably, the step that the terminal sends the identity information of the terminal and the network access identifier to the HSS through the MME includes: sending an Authentication and Key Agreement (AKA) including the identity information and the network access identifier to the MME by the terminal; authenticating an identity of the terminal by the MME, and sending the identity information and the network access identifier to the HSS when the identity of the terminal is authenticated successfully.

In the above embodiment, the MME authenticates the identity of the terminal by using a standard authentication process to authenticate the terminal, and no network switching is executed when the identity of the terminal fails to be authenticated.

In the above embodiment, preferably, when the HSS sends the network access identifier to the access gateway, the HSS further generates a first random number, and sends the first random number to the access gateway.

In the above embodiment, preferably, before the access gateway generates the seed key according to the network access identifier, the switching method further includes: checking freshness of the first random number, and generating the seed key after passing the freshness check.

In the above embodiment, through generating the first random number by the HSS and checking the freshness of the first random number by the access gateway, replay attack can be prevented effectively, and data safety can be ensured.

In the above embodiment, preferably, before the access gateway sends the seed key to the HSS, the switching method further includes: generating a second random number, and encrypting the seed key, the first random number and the second random number; and sending the seed key to the HSS by the access gateway, including: sending the seed key, the first random number and the second random number to the HSS after encrypting.

Similarly, through generating the second random number by the access gateway, the data safety during a transmission process can be ensured effectively. A public key of the HSS can be used as a key to encrypt the seed key, the first random number and the second random number.

In the above embodiment, preferably, the step that the HSS receives the seed key from the access gateway and sends the seed key to the terminal includes: decrypting the seed key, the first random number and the second random number by the HSS; and re-encrypting the seed key, the first random number and the second random number after decryption, and sending the seed key, the first random number and the second random number to the terminal.

In the above embodiment, by encrypting data to be sent to the terminal, the data safety can be ensured effectively.

In the above embodiment, preferably, before the HSS sends the local key and the local identifier to the AAA server of the target network, the switching method further includes: encrypting the local key and the local identifier.

In the above embodiment, preferably, before the access point and the terminal execute the network switching operation, the switching method further includes: the terminal sends an access request to the access point; when the access point receives the access request, the access point sends an authentication request to the terminal, to make the terminal respond to the authentication request and return response data; the access point receives the response data from the terminal, and returns successfully authenticated information to the terminal when an authentication of the terminal is determined to be passed according to the response data; the terminal executes a re-authentication process with the AAA server when the terminal receives the successfully authenticated information; and the AAA server sends the first handoff key to the access point when the AAA server determines that the re-authentication process with the terminal is successful.

In the above embodiment, preferably, the network switching operation executed by the access point and the terminal includes: when the access point determines that the first handoff key is the same as the second handoff key, executing a connection key generation operation with the terminal, for the terminal to connect to the access point using the connection key.

In the above embodiment, preferably, the MME is a Long Term Evaluation (LTE) MME, and the HSS is an LTE HSS, and the target network is a wireless local area network (WLAN).

Figure 2:
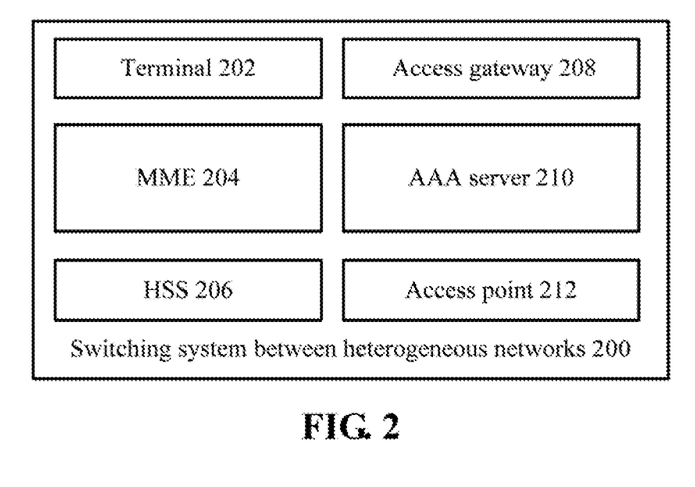
FIG. 2 shows a schematic diagram of one embodiment of a switching system between heterogeneous networks according to the present disclosure.

FIG. 2 shows a schematic diagram of one embodiment of a switching system between heterogeneous networks according to the present disclosure.

As shown in FIG. 2, according to one embodiment of the present disclosure, the switching system between heterogeneous networks 200 includes: a terminal 202 configured to send identity information of the terminal 202 and a network access identifier of a target network to a home subscriber server (HSS) 206 through a mobile management entity (MME) 204, and calculate a second handoff key and a second handoff identifier to switch networks according to a seed key sent by the HSS 206; the HSS 206 configured to send the network access identifier to an access gateway 208 of the target network for the access gateway 208 to generate the seed key according to the network access identifier, receive the seed key from the access gateway 208 and send the seed key to the terminal 202, calculate a local key and a local identifier according to the seed key, and send the local key and the local identifier to an authentication, authorization and accounting (AAA) server 210 of the target network; the access gateway 208 configured to generate the seed key according to the network access identifier sent by the HSS 206, and send the seed key to the HSS 206; and the AAA server 210 configured to calculate a first handoff key and a corresponding first handoff identifier to switch the networks according to the local key and the local identifier sent by the HSS 206, and send the calculated first handoff key to an access point 212 of the target network, for the access point 212 and the terminal 202 to execute a network switching operation according to the first handoff key and the second handoff key.

In the above embodiment, by sending the seed key from the HSS 206 to the terminal 202, the terminal 202 can calculate the second handoff key for a network switching, and execute the network switching operation according to the first handoff key calculated by the AAA server 210 and the access point 212 of the target network. Compared with the EAP-AKA protocol used in the 3GPP standard, the present disclosure can effectively decreases the communication traffic of the re-authentication process when a cellular network (for example, an LTE network) is switched to a WLAN, thereby decreasing the time delay of re-authentication, and effectively increasing the probability of success in switching. In addition, as little change has been made to current communication protocols by the present disclosure, thus, the present disclosure can be deployed to current network systems conveniently.

In the above embodiment, preferably, the terminal 202 is further configured to send an Authentication and Key Agreement (AKA) including the identity information and the network access identifier to the MME 204; and the MME 204 is configured to authenticate an identity of the terminal 202, and send the identity information and the network access identifier to the HSS 206 when the identity of the terminal 202 is authenticated successfully.

In the above embodiment, the MME 204 authenticates the identity of the terminal 202 by using a standard authentication process to authenticate the terminal 202, and no network switching is executed when the identity of the terminal 202 fails to be authenticated.

In the above embodiment, preferably, the HSS 206 is further configured to: generate a first random number and send the first random number to the access gateway 208, when the HSS sends the network access identifier to the access gateway 208.

In the above embodiment, preferably, before generating the seed key according to the network access identifier, the access gateway 208 is further configured to: check freshness of the first random number, and generate the seed key after passing the freshness check.

In the above embodiment, through generating the first random number by the HSS 206 and checking the freshness of the first random number by the access gateway 208, replay attack can be prevented effectively, and data safety can be ensured.

In the above embodiment, preferably, before the access gateway 208 sends the seed key to the HSS 206, the access gateway 208 is further configured to: generate a second random number, and encrypt the seed key, the first random number and the second random number; and send the seed key, the first random number and the second random number to the HSS 206 after encrypting.

Similarly, through generating the second random number by the access gateway 208, the data safety during a transmission process can be ensured effectively. A public key of the HSS 206 can be used as a key to encrypt the seed key, the first random number and the second random number.

In the above embodiment, preferably, the HSS 206 is further configured to: decrypt the seed key, the first random number and the second random number; and re-encrypt the seed key, the first random number and the second random number after decryption, and send the seed key, the first random number and the second random number to the terminal 202.

In the above embodiment, by encrypting data to be sent to the terminal 202, the data safety can be ensured effectively.

In the above embodiment, preferably, before the HSS 206 sends the local key and the local identifier to the AAA server 210 of the target network, the HSS 206 is further configured to: encrypt the local key and the local identifier.

In the above embodiment, preferably, before executing the network switching operation with the access point 212, the terminal 202 is further configured to: send an access request to the access point 212, respond to an authentication request sent by the access point 212, and return response data of the authentication request to the access point 212; and execute a re-authentication process with the AAA server 210 when the terminal 202 receives successfully authenticated information sent from the access point 212; the access point 212 is further configured to: send the authentication request to the terminal 202 when the access point 212 receives the access request from the terminal 202, to make the terminal 202 respond to the authentication request; and receive the response data from the terminal 202, and return the successfully authenticated information to the terminal 202 when an authentication of the terminal 202 is determined to be passed according to the response data; and the AAA server 210 is further configured to send the first handoff key to the access point 212 when the AAA server 210 determines that the re-authentication process with the terminal 202 is successful.

In the above embodiment, preferably, the access point 212 is further configured to: determine whether the first handoff key is the same as the second handoff key; and when the first handoff key is the same as the second handoff key, execute a connection key generation operation with the terminal 212, for the terminal 212 to connect to the access point 212 using the connection key.

In the above embodiment, preferably, the MME 204 is an MME 204 in the LTE, and the HSS 206 is a HSS 206 in the LTE, and the target network is a WLAN.

Figure 3:
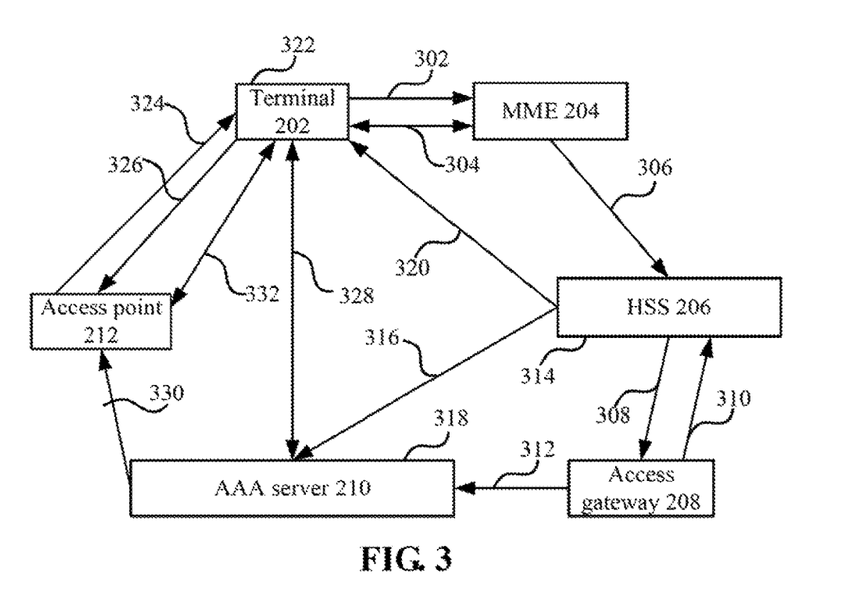
FIG. 3 shows a schematic diagram of one embodiment of a data interaction process of multiple parts of the switching system between heterogeneous networks according to the present disclosure.

In addition, a data interaction process of multiple parts of the switching system between heterogeneous networks 200 as shown in FIG. 2 is presented in FIG. 3.

FIG. 3 shows a schematic diagram of one embodiment of the data interaction process of multiple parts of the switching system between heterogeneous networks according to the present disclosure.

In one embodiment, switching represents mobility management (MM) of a terminal in a Radio Resource Control (RRC) connection state. In heterogeneous wireless networks, switching between different access networks can be called vertical handoff (VHO), and switching between the same access networks can be called horizontal handoff (HHO).

It should be illustrated that, the terminal 202 as mentioned in the above embodiments is a terminal that can access the LTE network and the WLAN; the MME 204 and the HSS 206 are LTE network apparatus; the access gateway 208, the AAA server 210 and the access point 212 are WLAN apparatus.

As shown in FIG. 3, the data interaction process of multiple parts of the switching system between heterogeneous networks according to the present disclosure, includes:

Step 303, the terminal 202 sends AKA identity information to the MME 204, the AKA identity information includes International Mobile Subscriber Identity (IMSI) or Temporary Mobile Subscriber Identity (TMSI) of the terminal 202, and a network access identifier (NAI) to connect to a WLAN.

Step 304, the MME 204 uses a standard authentication process to authenticate the terminal 202. If the identity of the terminal 202 fails to be authenticated, the procedure is ended; otherwise, next step is executed.

Step 306, the MME 204 sends the NAI and IMSI or TMSI of the terminal 202 to the HSS 206, to inform a switching request.

Step 308, the HSS 206 generates a random number $n_1$, and sends $n_1$ and the NAI to the access gateway (AG) 208.

Step 310, after the access gateway 208 checks the freshness of the random number $n_1$ (to prevent replay attacks), the access gateway 208 generates a seed key $K_i$ and a random number $n_2$, and encrypts $[K_i, n_1, n_2]$ by using a public key of the HSS 206, and then sends cryptograph of $[K_i, n_1, n_2]_{PKHSS}$ to the HSS 206.

Step 312, the access gateway 208 encrypts $[K_i, n_2]$ by using a public key of the AAA server 210, and sends cryptograph of $[K_i, n_2]_{PKAAA}$ to the AAA server 210.

Step 314, after the HSS 206 receives a message from the access gateway 208, the HSS 206 decrypts the message by using its private key, and calculates a local key (LK) and a local identifier (LID) according to parameters acquired from decryption, a detailed formula is provided below:

LK=f(CK, IK, $K_i$, $n_1$); LID=f(CK, IK, $n_1$), in which $f_K$ is a message identifier function that uses a key K, CK is a cryptographic key, and IK is an integrity key.

The local key LK can be used to execute a horizontal handoff in a WLAN. When a usage times of the LK reaches a threshold N, namely the horizontal handoff in the WLAN has been executed for N times, thus, a new local key LK needs to be regenerated.

Step 316, the HSS 206 uses the public key of the AAA server 210 to encrypt [LK, LID], and sends cryptograph of [LK, LID]$_{PK_{AAA}}$ to the AAA server 210.

Step 318, the AAA server 210 receives information from the HSS 206 and the access gateway 208, decrypts the information by using its private key, and calculates a handoff key (HK) and a handoff identifier (HID) according to a following formula:

$$HK=f(n_2,LK); HID=f(n_2,LID).$$

Step 320, the HSS 206 uses CK to encrypt [$K_i$, $n_1$, $n_2$], and sends cryptograph of [$K_i$, $n_1$, $n_2$]$_{CK}$ to the terminal 202.

Step 322, the terminal 202 uses CK to decrypt received information from the HSS 206, and calculates four parameters including LK, LID, HK and HID.

Step 324, the access point (AP) 212 sends an Extensible Authentication Protocol Over LAN (EAPOL) request to the terminal 202. Surely, before step 324, the terminal 202 needs to send an access request to the access point 212.

Step 326, the terminal 202 sends response data based on EAPOL to the access point 212.

Step 328, the terminal 202 executes an Extensible Authentication Protocol (EAP) process with the AAA server 212.

Step 330, the AAA server 210 sends a HK to the access point 212, and transmits EAP success information to the terminal 202 through the access point 212.

Step 332, a HK generation process is executed between the terminal 202 and the access point 212.

The present disclosure in the above embodiment can achieve a re-authentication process during switching process from the LTE network to the WLAN, and can effectively decreases the communication traffic of the re-authentication process when the LTE network is switched to the WLAN, thereby decreasing time delay of re-authentication, and effectively increasing the probability of success in switching. In addition, as little change has been made to current communication protocols by the present disclosure, thus, the present disclosure can be deployed to the current network systems conveniently.

The present disclosure has been explicated above by referring to the drawings. The present disclosure provides a new way of switching between heterogeneous networks, the communication traffic of the re-authentication process can be effectively decreased when a cellular network (for example, an LTE network) is switched to a WLAN, thereby decreasing time delay of re-authentication, and effectively increasing the probability of success in switching.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A switching method between heterogeneous networks, comprising:
sending identity information of a terminal and a network access identifier of a target network to a home subscriber server (HSS) using the terminal through a mobile management entity (MME);
sending the network access identifier by the HSS to an access gateway of the target network, comprising:
generating a first random number and sending the first random number to the access gateway;
checking freshness of a first random number and generating a seed key after passing the freshness check by the access gateway;
receiving the seed key by the HSS from the access gateway and sending the seed key to the terminal, calculating a local key and a local identifier according to the seed key, and sending the local key and the local identifier to an authentication, authorization, and accounting (AAA) server of the target network, for the AAA server to calculate a first handoff key and a corresponding first handoff identifier to switch networks;
calculating a second handoff key and a second handoff identifier according to the seed key by the terminal, to switch the networks; and
sending the calculated first handoff key by the AAA server to an access point of the target network, for the access point and the terminal to execute a network switching operation according to the first handoff key and the second handoff key, the network switching operation comprising: when the access point determines that the first handoff key is the same as the second handoff key, executing a connection key generation operation with the terminal, and connecting to the access point using the connection key by the terminal.

2. The switching method between heterogeneous networks of claim 1, wherein the step of sending the identity information of the terminal and the network access identifier to the HSS using the terminal through the MME comprises:
sending an Authentication and Key Agreement (AKA) comprising the identity information and the network access identifier to the MME by the terminal; and
authenticating an identity of the terminal by the MME, and sending the identity information and the network access identifier to the HSS when the identity of the terminal is authenticated successfully.

3. The switching method between heterogeneous networks of claim 1, before the access gateway sends the seed key to the HSS, further comprising:
generating a second random number, and encrypting the seed key, the first random number and the second random number; and
sending the seed key to the HSS by the access gateway, comprising: sending the seed key, the first random number and the second random number to the HSS after encrypting.

4. The switching method between heterogeneous networks of claim 3, wherein receiving the seed key by the HSS from the access gateway and sending the seed key to the terminal comprises:
decrypting the seed key, the first random number and the second random number by the HSS; and
re-encrypting the seed key, the first random number and the second random number after decryption, and sending the seed key, the first random number and the second random number to the terminal.

5. The switching method between heterogeneous networks of claim 3, before the HSS sends the local key and the local identifier to the AAA server of the target network, further comprising:
encrypting the local key and the local identifier.

6. The switching method between heterogeneous networks of claim 1, before the access point and the terminal execute the network switching operation, further comprising:

sending an access request to the access point by the terminal;

receiving the access request by the access point, sending an authentication request to the terminal, to make the terminal respond to the authentication request and return response data;

receiving the response data from the terminal by the access point, and returning successfully authenticated information to the terminal when an authentication of the terminal is determined to be passed according to the response data;

executing a re-authentication process with the AAA server by the terminal when the terminal receives the successfully authenticated information;

sending the first handoff key to the access point when the AAA server determines that the re-authentication process with the terminal is successful.

7. The switching method between heterogeneous networks of claim 1, wherein the MME is a Long Term Evaluation (LTE) MME, and the HSS is an LTE HSS, and the target network is a wireless local area network (WLAN).

8. A switching system between heterogeneous networks, comprising:

a terminal device that sends identity information of the terminal and a network access identifier of a target network to a home subscriber server (HSS) through a mobile management entity (MME), and calculates a second handoff key and a second handoff identifier to switch networks according to a seed key sent by the HSS;

the HSS that sends the network access identifier to an access gateway of the target network for the access gateway to generate the seed key according to the network access identifier, generates a first random number, sends the first random number to the access gateway, receives the seed key from the access gateway and send the seed key to the terminal, calculates a local key and a local identifier according to the seed key, and sends the local key and the local identifier to an authentication, authorization and accounting (AAA) server of the target network;

the access gateway that checks freshness of the first random number, generates the seed key according to the network access identifier sent by the HSS after passing the freshness check, and sends the seed key to the HSS;

the AAA server that calculates a first handoff key and a corresponding first handoff identifier to switch the networks according to the local key and the local identifier sent by the HSS, and sends the calculated first handoff key to an access point of the target network, for the access point and the terminal to execute a network switching operation according to the first handoff key and the second handoff key, the network switching operation comprising: when the access point determines that the first handoff key is the same as the second handoff key, the access point executes a connection key generation operation with the terminal, and the terminal connects to the access point using the connection key by the terminal.

9. The switching system between heterogeneous networks of claim 8, wherein:

the terminal further sends an Authentication and Key Agreement (AKA) comprising the identity information and the network access identifier to the MME; and the MME authenticates an identity of the terminal, and sends the identity information and the network access identifier to the HSS when the identity of the terminal is authenticated successfully.

10. The switching system between heterogeneous networks of claim 8, before the access gateway sends the seed key to the HSS, wherein the access gateway further:

generates a second random number, and encrypts the seed key, the first random number and the second random number; and sends the seed key, the first random number and the second random number to the HSS after encrypting.

11. The switching system between heterogeneous networks of claim 10, wherein the HSS further:

decrypts the seed key, the first random number and the second random number; and re-encrypts the seed key, the first random number and the second random number after decryption, and sends the seed key, the first random number and the second random number to the terminal.

12. The switching system between heterogeneous networks of claim 10, before the HSS sends the local key and the local identifier to the AAA server of the target network, wherein the HSS further:

encrypts the local key and the local identifier.

13. The switching system between heterogeneous networks of claim 8, wherein:

the terminal further:

sends an access request to the access point before executing the network switching operation with the access point, responds to an authentication request sent by the access point, and returns response data of the authentication request to the access point; and executes a re-authentication process with the AAA server when the terminal receives successfully authenticated information sent from the access point;

the access point further:

sends the authentication request to the terminal when the access point receives the access request from the terminal, to make the terminal respond to the authentication request; and receives the response data from the terminal, and returns the successfully authenticated information to the terminal when an authentication of the terminal is determined to be passed according to the response data; and the AAA server further sends the first handoff key to the access point when the AAA server determines that the re-authentication process with the terminal is successful.

14. The switching system between heterogeneous networks of claim 8, wherein the MME is a Long Term Evaluation (LTE) MME, and the HSS is an LTE HSS, and the target network is a wireless local area network (WLAN).

* * * * *